Figure 1:
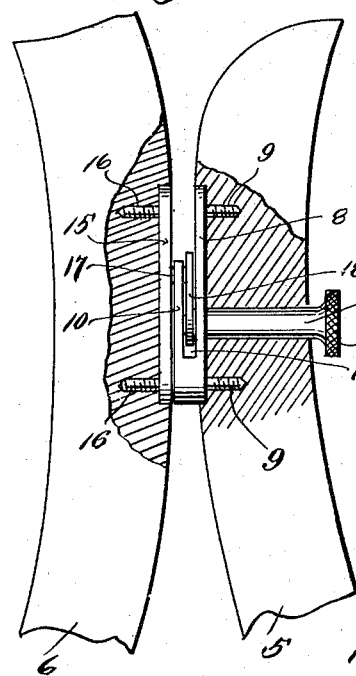

H. C. RAY.
MIRROR HINGE AND CLAMP.
APPLICATION FILED MAR. 28, 1916.

1,192,116.

Patented July 25, 1916.

Inventor
H. C. Ray.

Witnesses
By
Attorney

UNITED STATES PATENT OFFICE.

HERBERT C. RAY, OF SPOKANE, WASHINGTON.

MIRROR HINGE AND CLAMP.

1,192,116. Specification of Letters Patent. Patented July 25, 1916.

Application filed March 28, 1916. Serial No. 87,309.

*To all whom it may concern:*

Be it known that I, HERBERT C. RAY, a citizen of the United States, residing at Spokane, in the county of Spokane, State of Washington, have invented certain new and useful Improvements in Mirror Hinges and Clamps; and I do hereby declare the following to be a full, clear, and exact description of the invention, such as will enable others skilled in the art to which it appertains to make and use the same.

This invention relates to mirror hinges and clamps, and may be more particularly associated with means whereby mirrors on dressers, chiffonniers, and other similar articles of furniture may be securely hinged for tilting movement thereon, and whereby the said mirror may be held firmly in the various positions of its tilting movement.

The primary object of the invention is to provide simple and efficient means for attaining the above mentioned ends, further characterized by improved construction whereby the mirror may be readily removed from the standards with but little trouble and without danger of breaking or deranging the mirror supporting elements.

A further object of the invention is to provide a mirror hinge and clamp of such construction as to be practically invisible when properly applied to the mirror and standard, which is of extremely simple and inexpensive construction, which is composed of but few readily assembled parts, which may be quickly and conveniently operated, and which is capable of application to bureaus, chiffonniers, or other similar articles of furniture now in use, thereby obviating the necessity of specially constructed furniture.

A still further object of the invention is to provide in a device of the class described, improved means for tightening or binding the mirror frame in various positions of angular adjustment relative to the supporting standards without subjecting the latter to strain.

With these objects in view, together with others which will appear as the description proceeds, the invention resides in the novel combination and arrangement of parts, all as will be described more fully hereinafter, illustrated in the drawings and particularly pointed out in the claims.

Figure 2:
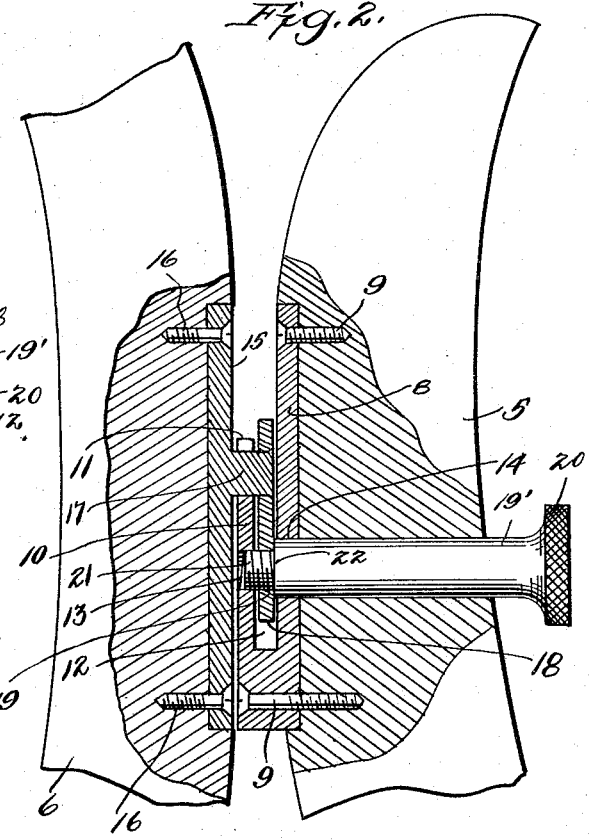
Figure 3:
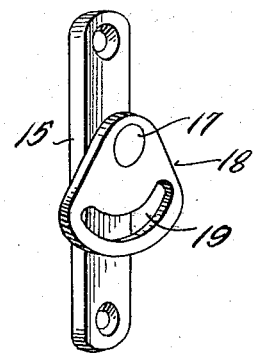
Figure 4:
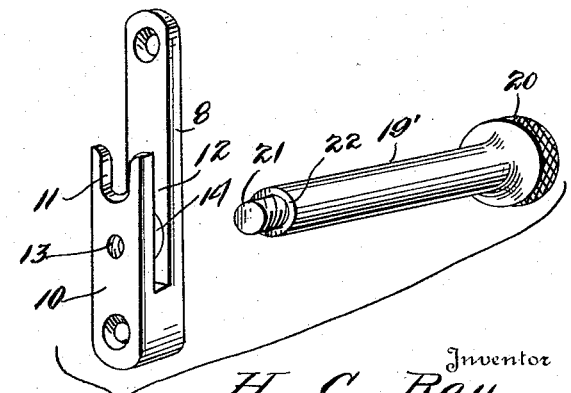

The invention will be best understood by reference to the accompanying drawings, wherein:

Figure 1, is a front elevation, partly in section, of a portion of a standard and tilting mirror frame and illustrating the application of a hinge and clamp embodying my invention, Fig. 2, is a similar view illustrating the hinge and clamp elements in section, Fig. 3, is a detail perspective view of the pintle and bar removed from the mirror frame, and Fig. 4, is a similar view of the supporting member removed from the standard.

Referring now more particularly to the drawings, 5 indicates a mirror standard or support such as are commonly employed in connection with bureaus chiffonniers, and furniture of this character, to which one side of a mirror frame 6 is hingedly connected. It is to be understood that a standard 5 is arranged at each end of the bureau or chiffonnier to support the mirror 6 between the same, and while only one hinge and clamp is illustrated in the present instance it is to be understood that the device to be hereinafter detailed may be applied to the opposite standard if desired.

Embedded upon the inner face of the mirror standard 5 and disposed longitudinally of the latter is a metallic bar 8, the said bar being secured at its ends by screws 9. The lowermost portion of the bar 8 is thickened to project outwardly slightly beyond the inner face of the standard 5, and an arm 10 projects upwardly from the said thickened portion in spaced parallel relation to the body 8 of the bar. The arm 10 is preferably of a width equal to that of the bar 8, and terminates at its extremity slightly beyond the medial portion of the said bar. The free end of the said arm is bifurcated as at 11 to provide a suitable bearing crotch. The arm is spaced from the body portion of the bar a distance sufficient to provide a relatively narrow channel 12 as shown and the said arm is provided intermediate its ends with a transverse interiorly threaded aperture 13 of relatively small diameter. The body portion of the bar 8 is also provided with an aperture 14, the said aperture being alined with the arm opening and is of substantially greater diameter than the said opening 13.

A bar 15 of substantially the same length, width, and thickness of the bar 8 is embedded in the adjacent edge of the mirror frame 6, the said bar being secured to the said frame by means of screws 16. Projecting outwardly from the bar 15 is a stud or pintle 17 from the outer end of which depends a plate 18. This plate is rigidly connected to the said pintle end and is of a thickness to be conveniently accommodated for sliding movement within the channel 12 between the arm 10 and the body 8 of the standard member. The pintle 17 is adapted to rest within the bifurcation or crotch portion 11 upon the extremity of the arm 10 and the said arm lies between the plate 18 and body portion of the bar 15. The plate 18 is provided with an arcuate slot 19, the latter being alined with the openings 13 and 14 in the arm and bar 10 and 8 respectively, being substantially greater in width than the diameter of the former of said openings, and being of a width a trifle less than the latter opening. This slot 19 is struck from the center of the pintle 17, and therefore it will be seen that the arcuate slot is at all times alined with the said openings irrespective of the tilting movement of the mirror frame 6.

To secure the above described mirror support hinge member in its various positions of angular adjustment with relation to the standard 5, a screw member 19' is provided. This screw member comprises a shank of sufficient length to extend through the supporting standard 5 is headed as at 20 at one end, and is reduced at its innermost end to provide an exteriorly threaded stem 21. This stem is adapted to thread within the opening 13 in the arm 10, and the shoulder 22 formed at the juncture of the threaded portion of the body with the screw member or shank is adapted to engage and bind against the edges of the arcuate slot 19 in the plate 18. When the screw member is loosened, the mirror may be freely tilted, the said plate 18 sliding loosely within the channel 12, but upon screwing the threaded stem 21 in the opening 13 the shoulders 22 of the shank will engage with the edges of the slot 19 of the plate 18 to bind the latter against the inner face of the arm 10, whereby tilting movement of the mirror frame will be positively prevented. To remove the mirror from the standards, it is but necessary to withdraw the screw member 19, whereupon the mirror will be lifted upwardly to disengage the pintle 17 from the bifurcation or crotch 11. From this description it is apparent that a simple and efficient means is provided for properly securing a mirror to the supporting standard in such manner that the said mirror may be tilted or inclined to various degrees and held firmly in such position. It is understood that the opening 14 in the bar 8 is of sufficient diameter to permit of the shoulder end of the shank 19 passing through the same to enable the said shoulders to contact with the plate 18.

While I have herein shown and described a particular or preferred embodiment of the invention, I wish it to be understood that I need not confine myself to all the precise details of construction herein set forth by way of illustration as modification and variation may be made without departing from the spirit of the invention or exceeding the scope of the claims.

What is claimed is:

1. In a device of the class described, the combination with a standard and a swinging frame, an arm extending outwardly and upwardly from said standard to provide a channel between said arm and standard, a pintle on said frame, a bearing at the end of said arm in which said pintle rocks, a fixed plate on said pintle and suspended into said channel, and means for binding said plate against said arm, substantially as described.

2. In a device of the class described, the combination with a standard and a swinging frame, an arm projecting outwardly and upwardly from said standard to provide a channel between said standard and arm, the end of said arm being bifurcated, a pintle projecting outwardly from said frame and adapted to rest in said bifurcated portion, a rigid plate depending from said pintle for sliding movement within said channel, the said arm being provided with an opening, and the said plate being provided with an arcuate slot registering with said opening, and means adapted for engagement in said opening and slot for binding said plate against said arm, substantially as described.

3. In a device of the class described, the combination with a standard and a swinging frame, of bars secured to the adjacent faces of said standard and frame, an arm secured to and in spaced parallel relation to said standard bar, a bearing at the extremity of said arm, the said arm being provided with an interiorly threaded opening, the said standard bar being provided with an opening alined with said arm opening and of slightly greater diameter, a pintle on said frame bar adapted to rest in said bearing, a plate fixed on said pintle between said frame and standard bar, the said plate being provided with an arcuate slot alined with the openings in said arm and bar and being of slightly less width than the diameter of the latter, a shank, a threaded stem at the end of said shank for engagement within the opening in said arm, and a shoulder on said shank adapted to impinge upon the edges of said arcuate slot, substantially as described.

4. In a device of the class described, the combination with a standard and a swinging frame, of a pintle extending laterally of said frame, a fixed plate depending from said pintle, the said plate having an arcuate slot concentric with said pintle, an arm secured to said standard and lying beneath said plate and rotatably supporting said pintle at one end, the said arm being provided with a threaded aperture alined with said slot, and a stem extending through said standard and slot and engaged at its end in said aperture, substantially as described.

In testimony whereof, I affix my signature, in the presence of two witnesses.

HERBERT C. RAY.

Witnesses:
 D. K. MAY,
 LUETTA D. BISBEE.

Copies of this patent may be obtained for five cents each, by addressing the "Commissioner of Patents, Washington, D. C."